Nov. 18, 1930.  L. R. POWER  1,782,272
LATHE CENTER
Filed Jan. 12, 1929
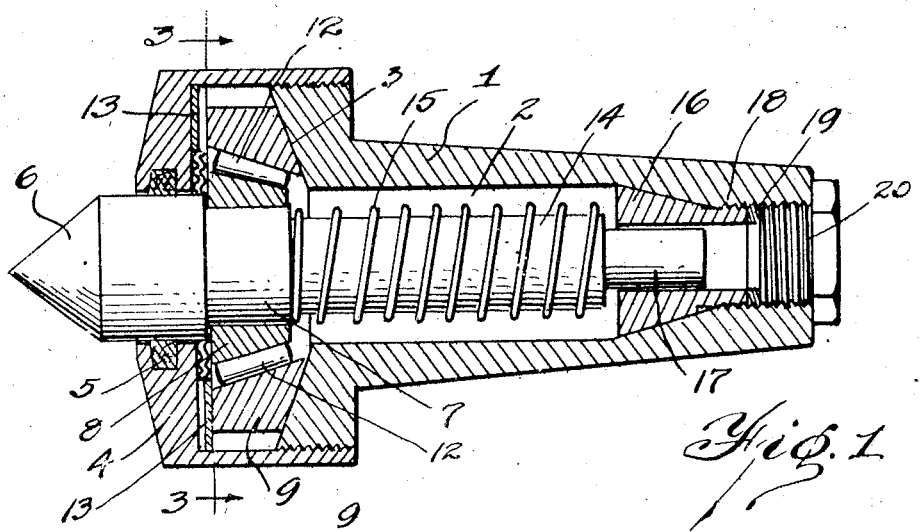
Fig. 1
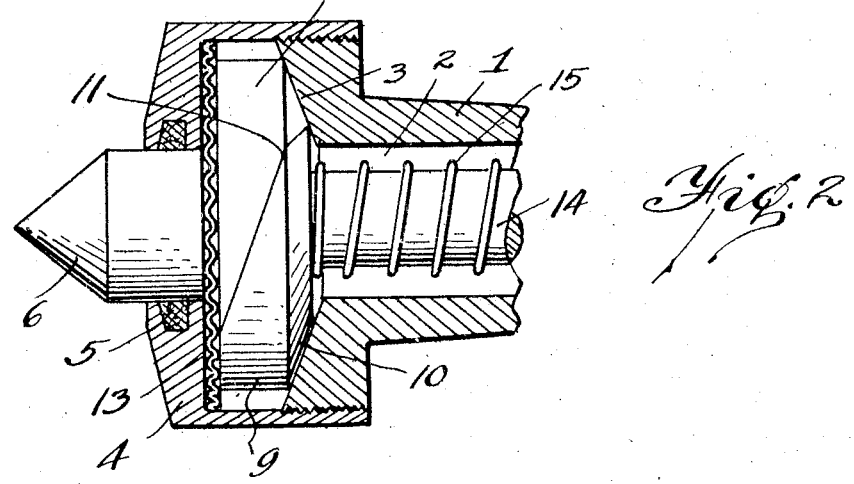
Fig. 2
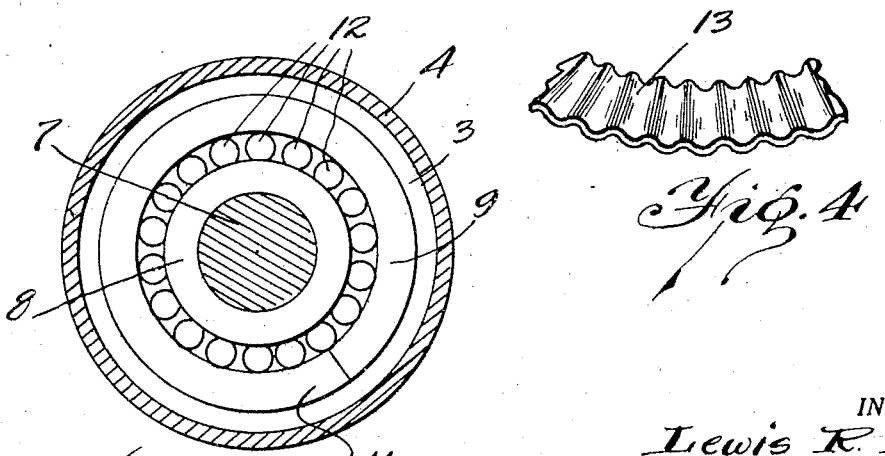
Fig. 3
Fig. 4
INVENTOR.
Lewis R. Power
BY
Charles E. Henry
ATTORNEY.

Patented Nov. 18, 1930

1,782,272

UNITED STATES PATENT OFFICE

LEWIS R. POWER, OF LAWTON, MICHIGAN

LATHE CENTER

Application filed January 12, 1929. Serial No. 332,103.

This invention relates to lathe centers and the object of the invention is to provide a lathe center adapted for mounting in the tail stock of a lathe and arranged to allow expansion of the work without placing undue strain on the lathe center.

A further object of the invention is to provide a lathe center in which the center is rotatable with the work in a stationary housing and supported in a bearing which allows rotation and at the same time acts as a thrust bearing.

A further object of the invention is to provide a means for properly centering the bearing at all times and at the same time allowing expansion of the bearing by movement of the center due to expansion of the work by generated heat.

A further object of the invention is to provide a lathe center in which the outer bearing race is expandable under pressure, the expansion being resisted by a spring to maintain the outer race in proper relation with the lathe center.

A further object of the invention is to provide a circumferentially split outer bearing race having a conical face engaging a conical face on the housing, the outer race being arranged to allow expansion radially of the conical face of the housing and the expansion of the outer race being resisted by a spring compressed by wedging action of the outer race during expansion.

These objects and the several novel features of the invention are hereinafter more fully described and claimed and the preferred form of construction by which these objects are attained is shown in the accompanying drawings in which—

Fig. 1 is a section through a lathe center embodying my invention.

Fig. 2 is a similar section showing the outer bearing race and spring in elevation.

Fig. 3 is a section taken on line 3—3 of Fig. 1.

Fig. 4 is a perspective view of a portion of the corrugated spring.

As shown in Fig. 1 the device comprises a housing 1 adapted to be secured in the tail stock of a lathe. This housing is provided with a central bore 2 and with a conical face 3 at the outer end whose axis is concentric with the axis of the central bore. A cap 4 is threaded onto the end of the housing 1 and carries a packing ring 5 riding in contact with the rotatable lathe center 6. This lathe center 6 is provided with a portion 7 of reduced diameter within the cap 4 and an inner bearing race 8 is shrunk onto the portion 7 of reduced diameter. The outer bearing race 9 is provided with a conical face 10 shown in Fig. 2 riding in contact with the conical face 3 of the housing 1 and this outer race is provided with a slot 11 extending through the race and about half the circumference of the outer race.

A series of tapered bearing rollers 12 are positioned between the inner bearing race 8 and the outer bearing race 9 and an annular corrugated sheet metal spring washer 13 is positioned within the cap 4 and engages the face of the outer bearing race opposite the conical face 10. By threading the cap 4 up tightly onto the housing 1 this corrugated spring may be placed under tension between the cap and the outer bearing race. The lathe center 6 is provided with a portion 14 of reduced diameter within the bore 2 and a wire 15 is wound spirally about the portion 14 to carry the oil backwardly to oil the rear bearing 16 for the end 17 of the center shaft. This bearing 16 is threaded into threads 18 in the housing 1 and in order to lock this bearing from rotation a lock washer 19 is provided which is engaged between the lock nut 20 and the bearing 16 thus preventing loosening of the bearing.

The entire housing is preferably filled with oil and the nut 20 prevents leakage of oil through the rear end of the housing while the packing 5 prevents leakage through the cap. The device is mounted in the tail stock of a lathe and this tail stock is moved up to bring the center 6 into engagement with the work.

During cutting of the work the work often tends to heat up causing expansion of the work and forcing the lathe center 6 toward the right of Fig. 1. This carries the inner bearing race 8 slightly to the right of Fig. 1 and by means of the rollers 12 in the roller bearing it tends to expand the split outer race 9 of the bearing radially. This causes radial outward movement of the outer ball race 9 up the inclined conical face 3 of the housing which tends to force the outer ball race 9 to the left against the corrugated spring ring 13 tending to flatten this ring. It will thus be seen that the expansion of the outer ball race is resisted by the corrugated spring ring in combination with the conical face 3 of the housing and thus the outer ball race 9 is firmly supported at all times and at the same time may expand and contract to a limited extent. The heat of the work is also communicated to the rotatable lathe center 6 tending to cause expansion of this member and while longitudinal expansion of the rotatable lathe center is allowable due to the clearances the radial expansion particularly of the portion 7 is taken up by the yieldability of this outer bearing race.

The rollers 12 are tapered and act as thrust bearings as well as a bearing in which the member 6 may rotate. It is also to be particuarly noted that the conical face 3 centers the outer bearing race 9 at all times in relation to the center of the bore 2 due to the fact that the conical face 3 extends about a complete circle and the conical face 10 of the outer ball race accurately fits the conical face 3 of the housing. Due to this fact the center line of the rotatable center 6 remain always on the same axis irrespective of the expansion of the outer bearing race.

From the foregoing description it becomes evident that the device is very simple and efficient in operation, will not easily get out of order, will maintain the rotatable lathe center centrally in the housing while at the same time allowing expansion of the work or of the lathe center and provides a device which accomplishes the objects described.

Having thus fully described my invention, its utility and mode of operation, what I claim and desire to secure by Letters Patent of the United States is—

1. In a lathe center, a housing adapted to be secured in the tail stock of a lathe, the said housing being provided with a central bore and a flanged outer end having a conical face opening toward the central bore, a rotatable lathe center extending into the central bore of the housing, a bearing in the said central bore in which one end of the rotatable lathe center is rotatably mounted, an inner bearing race secured to the end of the rotatable lathe center opposite the said bearing and having a conical face, a series of bearing rollers positioned on the said face, an outer bearing race positioned about the said bearing rollers and having a conical face seating against the conical face of the housing, the outer bearing race being split through a portion of its circumference, a cap threaded onto the flanged end of the housing, a yieldable member carried by the cap, and adapted to engage the outer bearing race between the yieldable member and the conical face of the housing as the cap is threaded onto the housing.

2. In a lathe center, a housing adapted to be secured in the tail stock of a lathe, the said housing being provided with a central bore and a flanged outer end, the said flanged outer end being provided with a conical face whose axis coincides with the axis of the central bore, the said conical face opening toward the central bore, a rotatable lathe center extending into the central bore of the housing, an inner bearing race secured to the rotatable lathe center, an outer bearing race fitting the conical face of the housing, a series of bearing rollers positioned between the races with the axes thereof each extending at an angle to the axis of the rotatable lathe center, a cap threaded onto the flanged housing, and a yieldable member between the cap and the outer bearing race, the outer bearing race being split throughout a portion of its circumference.

3. In a lathe center, a housing having a central bore therethrough, a bearing threaded into the end of said central bore, a lock nut threaded into the said bore adjacent the said bearing, a lock washer between the bearing and the lock nut adapted to be bindingly engaged therebetween, the housing being provided with a conical face at the end opposite the bearing opening toward the central bore, a rotatable lathe center rotatably mounted in the bearing and extending through the bore, a roller bearing mounted on the lathe center and having a face engaging the conical face of the housing, a cap having an aperture for the lathe center and threaded onto the housing, a yieldable member adapted to be bindingly engaged between the cap and the said bearing, and a packing in the cap about the aperture therein engaging the rotatable lathe center.

4. In a lathe center, a housing having a central bore and a conical face, a rotatable lathe center extending into the said bore, an inner bearing race secured to the rotatable lathe center, an outer bearing race fitting the conical face of the housing, said outer bearing race being diametrically expandable under pressure to relieve the bearing of excess pressure by reason of an expansion of the elements of the device by heat in operation, a series of bearing rollers between the inner and outer bearing races each extending at an angle to the axis of the rotatable lathe center, a cap apertured to fit over the rotatable lathe center and threaded onto the housing, and a radially corrugated spring ring within the cap adapted to engage the outer bearing race as the cap is threaded onto the housing.

5. In a lathe center, a housing having a central bore and a conical face thereabout, a bearing secured in one end of the bore, a rotatable lathe center rotatably mounted in the bearing, an inner bearing race secured to the rotatable lathe center adjacent the end opposite the said bearing, an outer bearing race fitting the conical face of the housing, said outer bearing race being split to permit diametrical expansion under pressure, a series of bearing rollers between the inner and outer bearing races, a cap threaded onto the housing, and a corrugated spring ring within the cap engaging the outer bearing race as the cap is threaded onto the housing.

6. In a lathe center, a housing having a central bore and a conical face thereabout, a rotatable lathe center positioned axially therein, a bearing race having one face thereof fitting the conical face of the housing, antifriction bearing members between the lathe center and the said race, said race being constructed to permit diametrical expansion thereof through expansion of the elements of the device due to heat, and yieldable means for maintaining said race in engagement with said conical face of the housing.

In testimony whereof I sign this specification.

LEWIS R. POWER.